(12) United States Patent
Machamer

(10) Patent No.: US 9,670,022 B2
(45) Date of Patent: Jun. 6, 2017

(54) PLATEN WEB SPLICER APPARATUS AND METHOD

(71) Applicant: Tamarack Products, Inc., Wauconda, IL (US)

(72) Inventor: David E. Machamer, Wauconda, IL (US)

(73) Assignee: Tamarack Products, Inc., Wauconda, IL (US)

( * ) Notice: Subject to any disclaimer, the term of this patent is extended or adjusted under 35 U.S.C. 154(b) by 4 days.

(21) Appl. No.: 14/844,836

(22) Filed: Sep. 3, 2015

(65) Prior Publication Data

US 2016/0068361 A1     Mar. 10, 2016

Related U.S. Application Data

(60) Provisional application No. 62/048,064, filed on Sep. 9, 2014.

(51) Int. Cl.
*B65H 21/00* (2006.01)
*B29C 65/74* (2006.01)
(Continued)

(52) U.S. Cl.
CPC .............. *B65H 21/00* (2013.01); *B29C 65/48* (2013.01); *B29C 65/743* (2013.01); *B29C 66/43* (2013.01);
(Continued)

(58) Field of Classification Search
CPC ......... Y10T 156/1052; Y10T 156/1054; Y10T 156/108; Y10T 156/1717; B29C 65/50;
(Continued)

(56) References Cited

U.S. PATENT DOCUMENTS

| 3,554,842 A | 1/1971 | Byrt |
| 4,923,546 A * | 5/1990 | Wheeler ............ B65H 19/1852 156/159 |

(Continued)

*Primary Examiner* — Mark A Osele
*Assistant Examiner* — Nickolas Harm
(74) *Attorney, Agent, or Firm* — Greer, Burns & Crain, Ltd.

(57) ABSTRACT

Apparatus for splicing expiring and replenishing webs of a web material includes first and second spaced platens having respective facing inner surfaces defining a passageway for transit of the expiring web, where the platens are adapted for displacement toward and away from one another in a reciprocating manner. The first platen is adapted to engage an end of the replenishing web, while the second platen is adapted to engage and position the moving expiring web. Moving the platens together with their respective inner surfaces in close proximity to one another causes a cutting die on the first platen to sever the expiring web forming outfeeding and infeeding ends of the expiring web, and to attach the expiring web's outfeeding end to the replenishing web. Attached to the second platen in facing relation to the first platen and engaging the expiring web is an ironing pad to ensure firm contact and adhesion of expiring web to the replenishing web. During web splicing, the cutting die is transferred from the first platen to the second platen to free the replenishing web from the first platen, with the cutting die engaging and collecting or holding the expiring web's infeeding end.

37 Claims, 13 Drawing Sheets

(51) Int. Cl.
*B29C 65/48* (2006.01)
*B29C 65/00* (2006.01)
*B31F 5/04* (2006.01)
*B65H 19/20* (2006.01)
B29L 7/00 (2006.01)
B29K 101/00 (2006.01)
B29C 65/50 (2006.01)
B29C 65/78 (2006.01)
B65H 19/10 (2006.01)
B65H 19/18 (2006.01)
B29C 65/52 (2006.01)

(52) U.S. Cl.
CPC ............... *B29C 66/87* (2013.01); *B31F 5/04* (2013.01); *B65H 19/1852* (2013.01); *B65H 19/20* (2013.01); *B29C 65/50* (2013.01); *B29C 65/5092* (2013.01); *B29C 65/52* (2013.01); *B29C 65/74* (2013.01); *B29C 65/749* (2013.01); *B29C 65/785* (2013.01); *B29C 66/832* (2013.01); *B29K 2101/00* (2013.01); *B29L 2007/008* (2013.01); *B65H 19/102* (2013.01); *B65H 19/18* (2013.01); *B65H 19/1805* (2013.01); *B65H 2301/4633* (2013.01); *B65H 2301/46172* (2013.01); *B65H 2301/516* (2013.01); *B65H 2301/5131* (2013.01); *Y10T 156/108* (2015.01); *Y10T 156/1052* (2015.01); *Y10T 156/1054* (2015.01); *Y10T 156/1717* (2015.01)

(58) Field of Classification Search
CPC ..... B29C 65/5092; B29C 65/52; B29C 65/74; B29C 65/743; B29C 65/749; B29C 65/785; B29C 66/832; B65H 19/102; B65H 19/18; B65H 19/1805; B65H 19/20
USPC ..................................... 156/159, 164, 304.1
See application file for complete search history.

(56) References Cited

U.S. PATENT DOCUMENTS

| | | |
|---|---|---|
| 5,827,166 A | 10/1998 | Cestonaro et al. |
| 6,772,663 B2 | 8/2004 | Machamer |
| 8,002,924 B2 | 8/2011 | Machamer |
| 2011/0245056 A1 | 10/2011 | Machamer et al. |

* cited by examiner

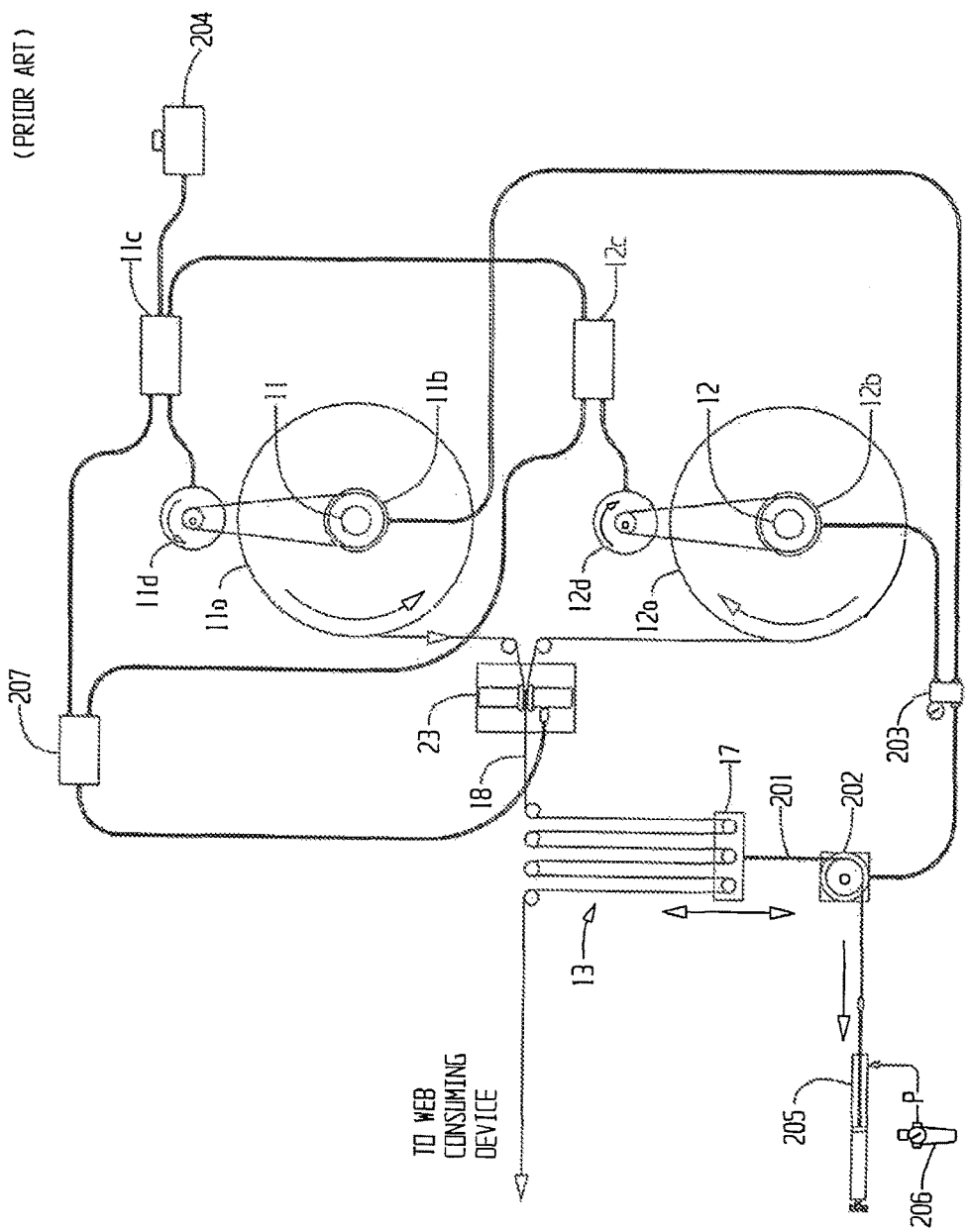

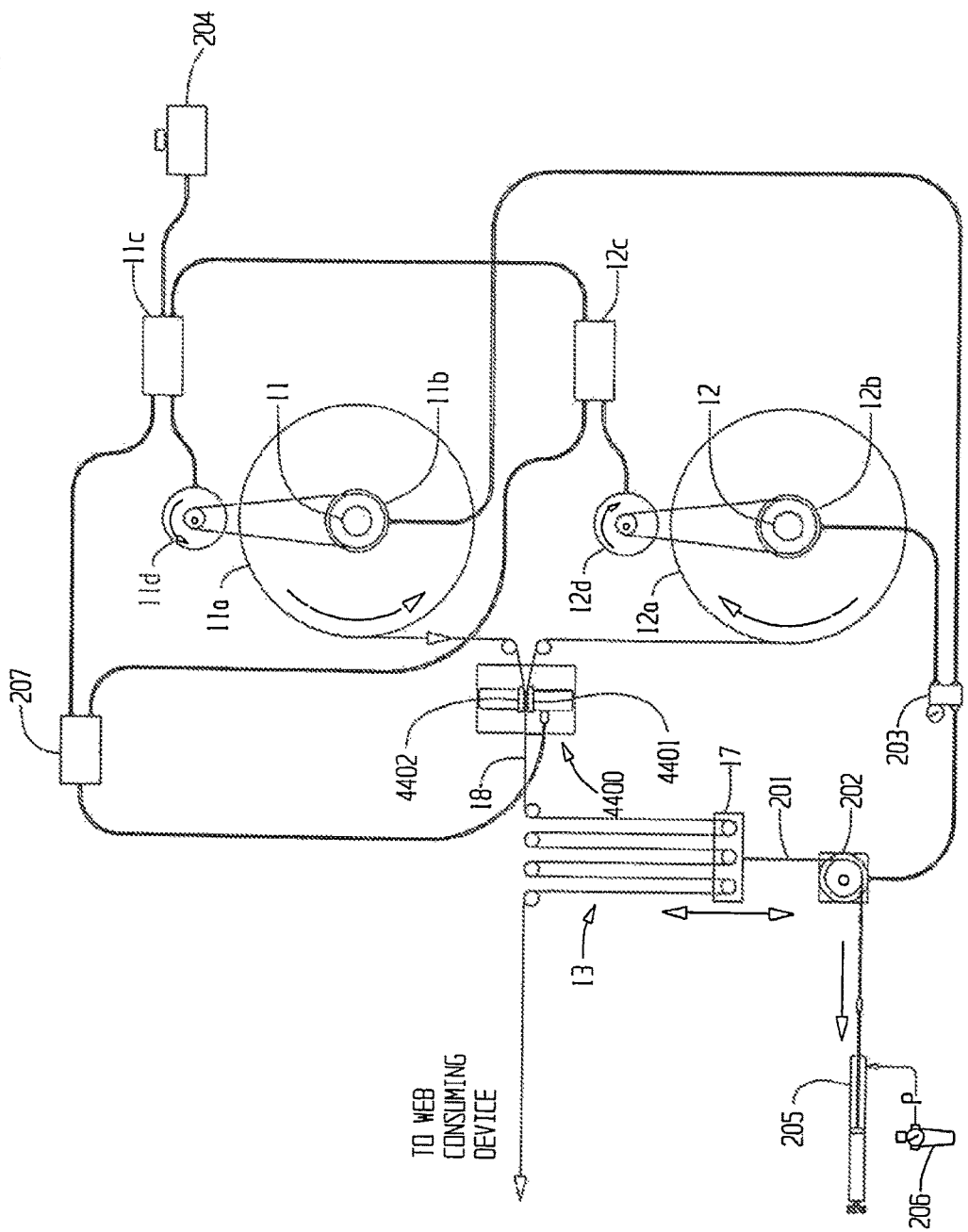

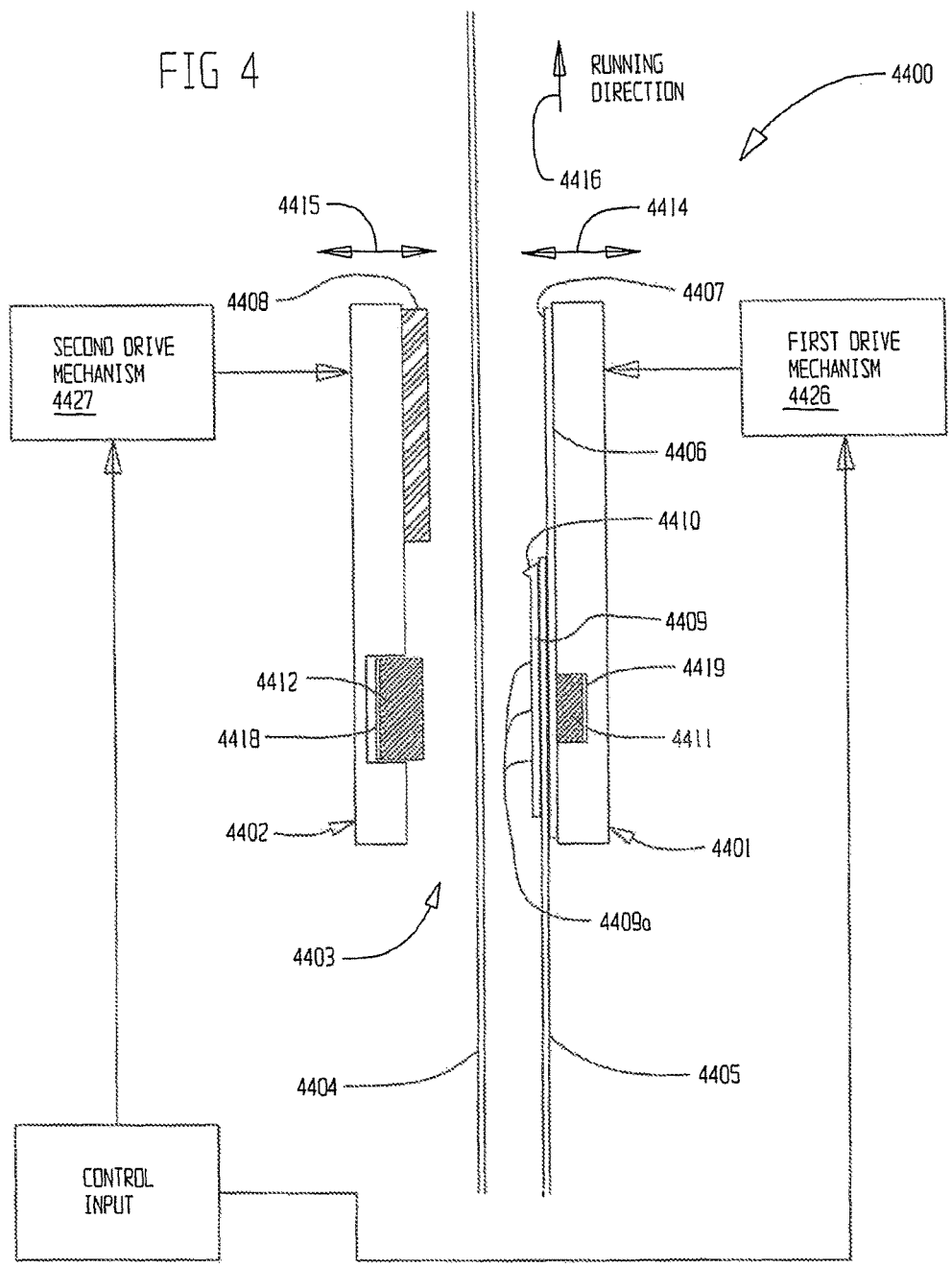

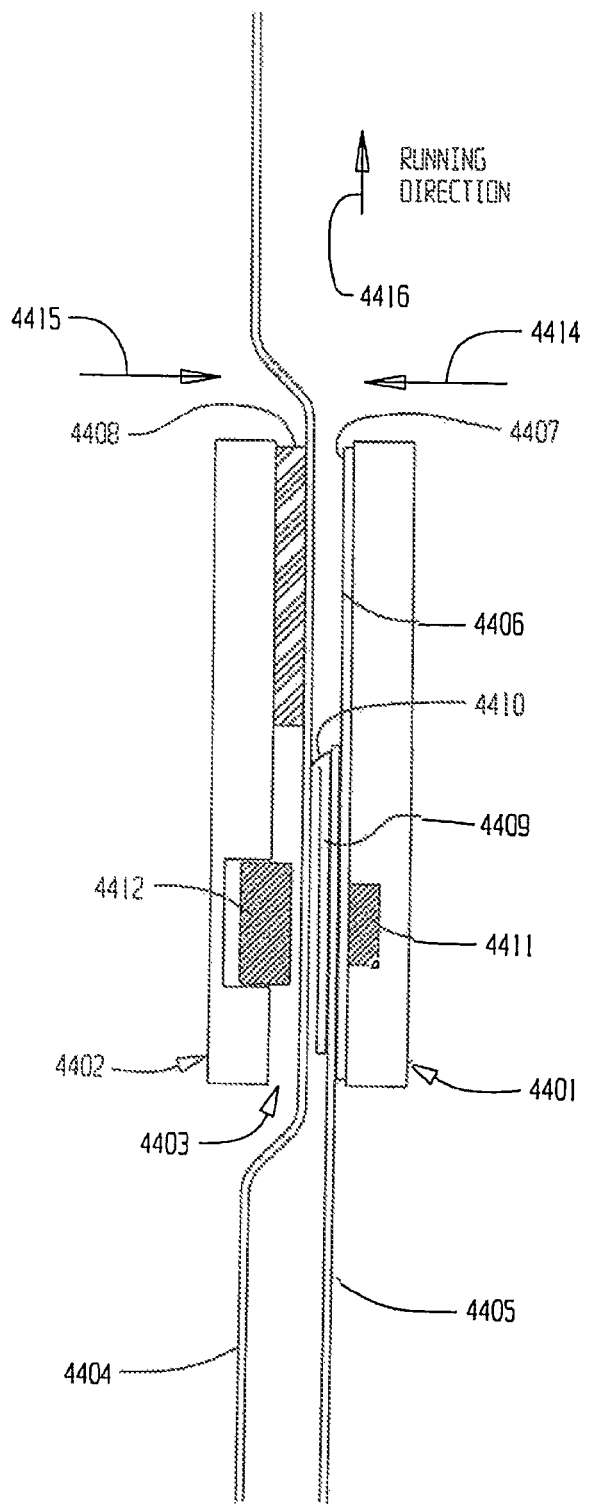

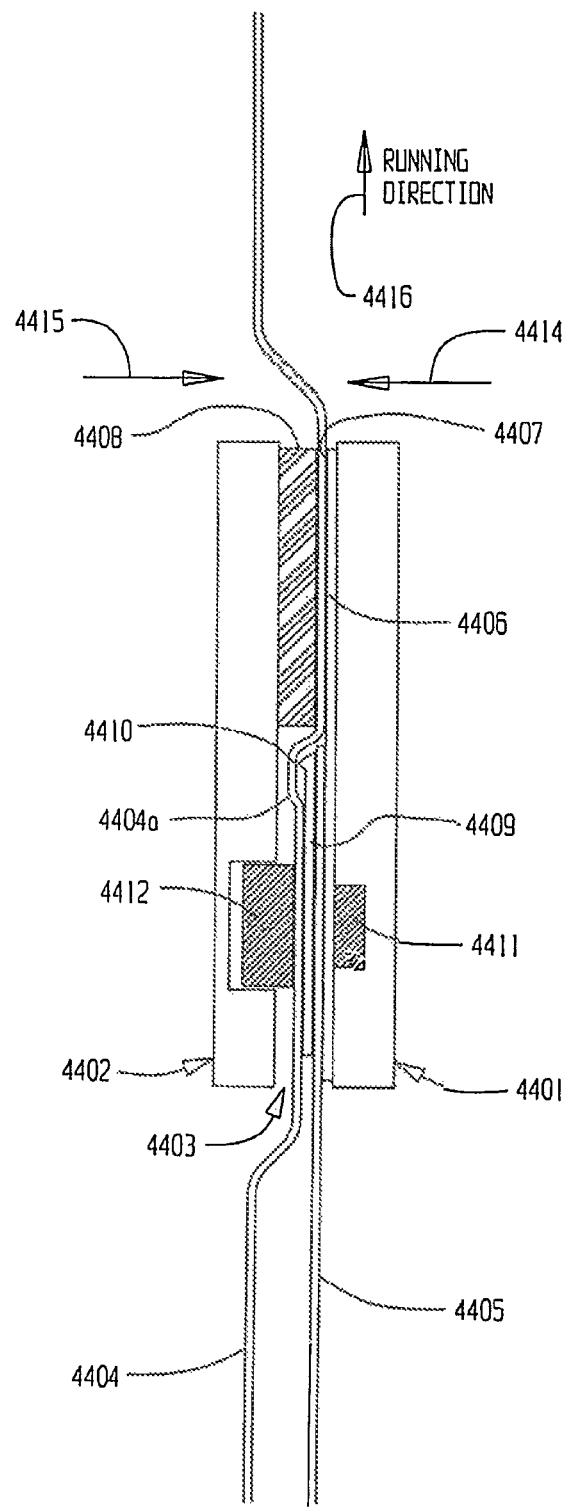

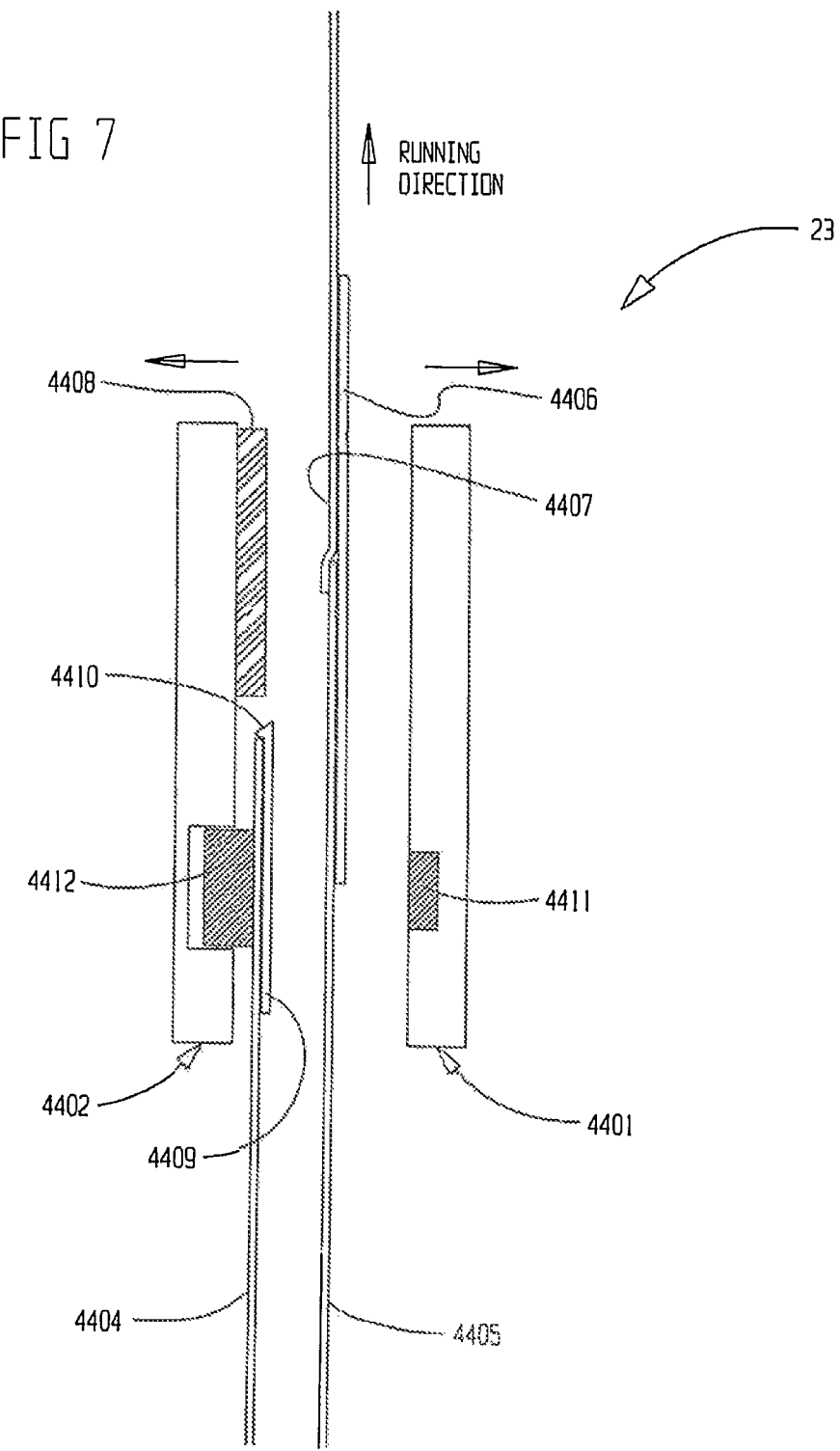

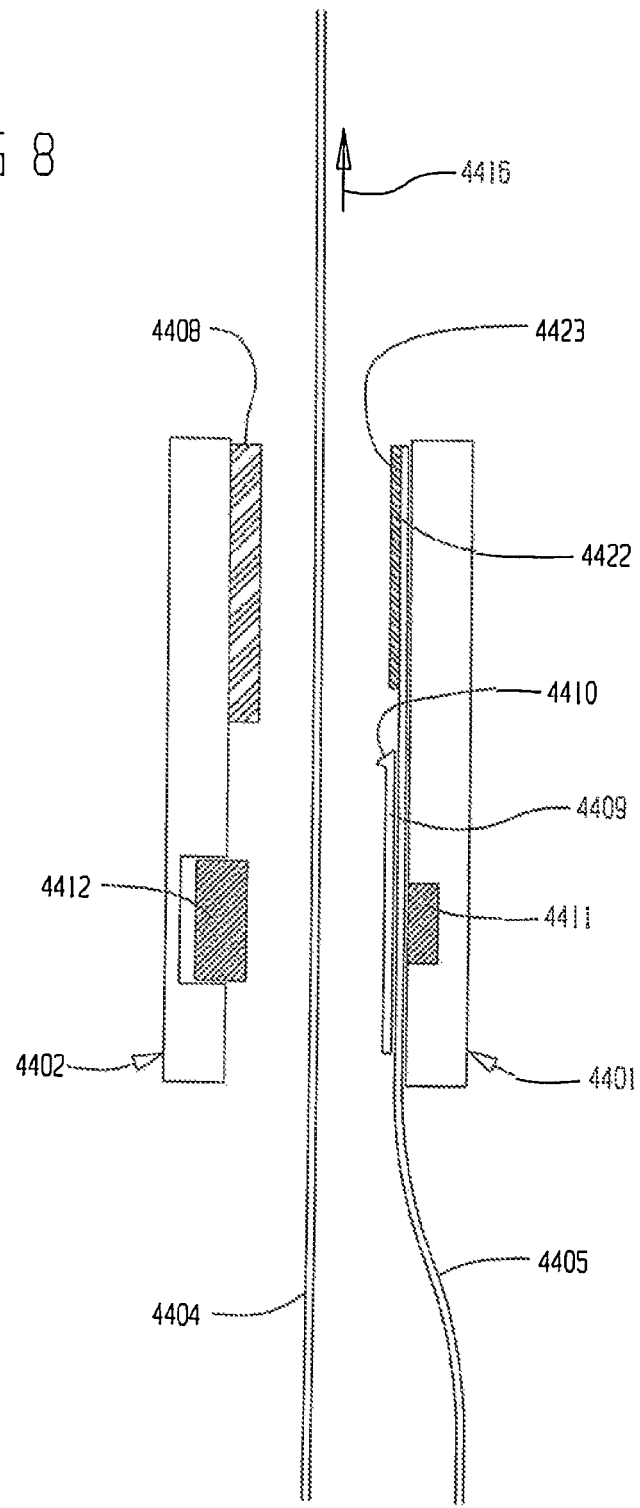

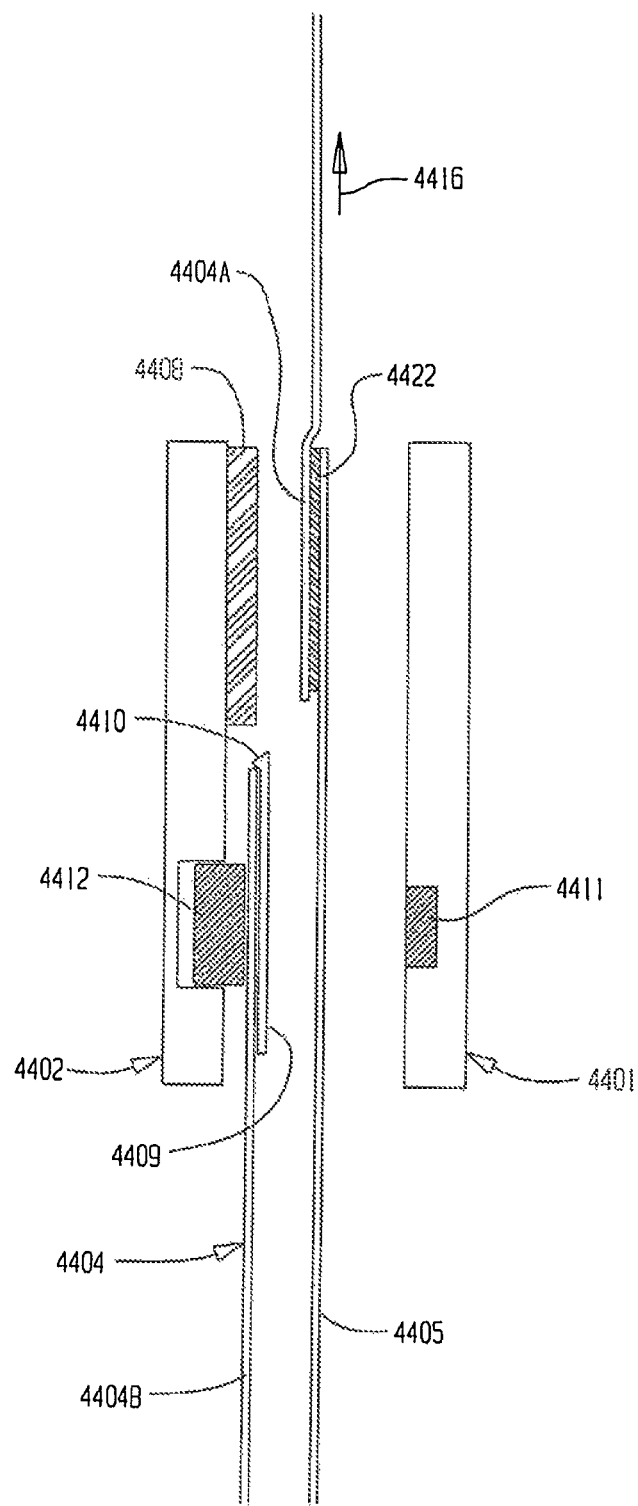

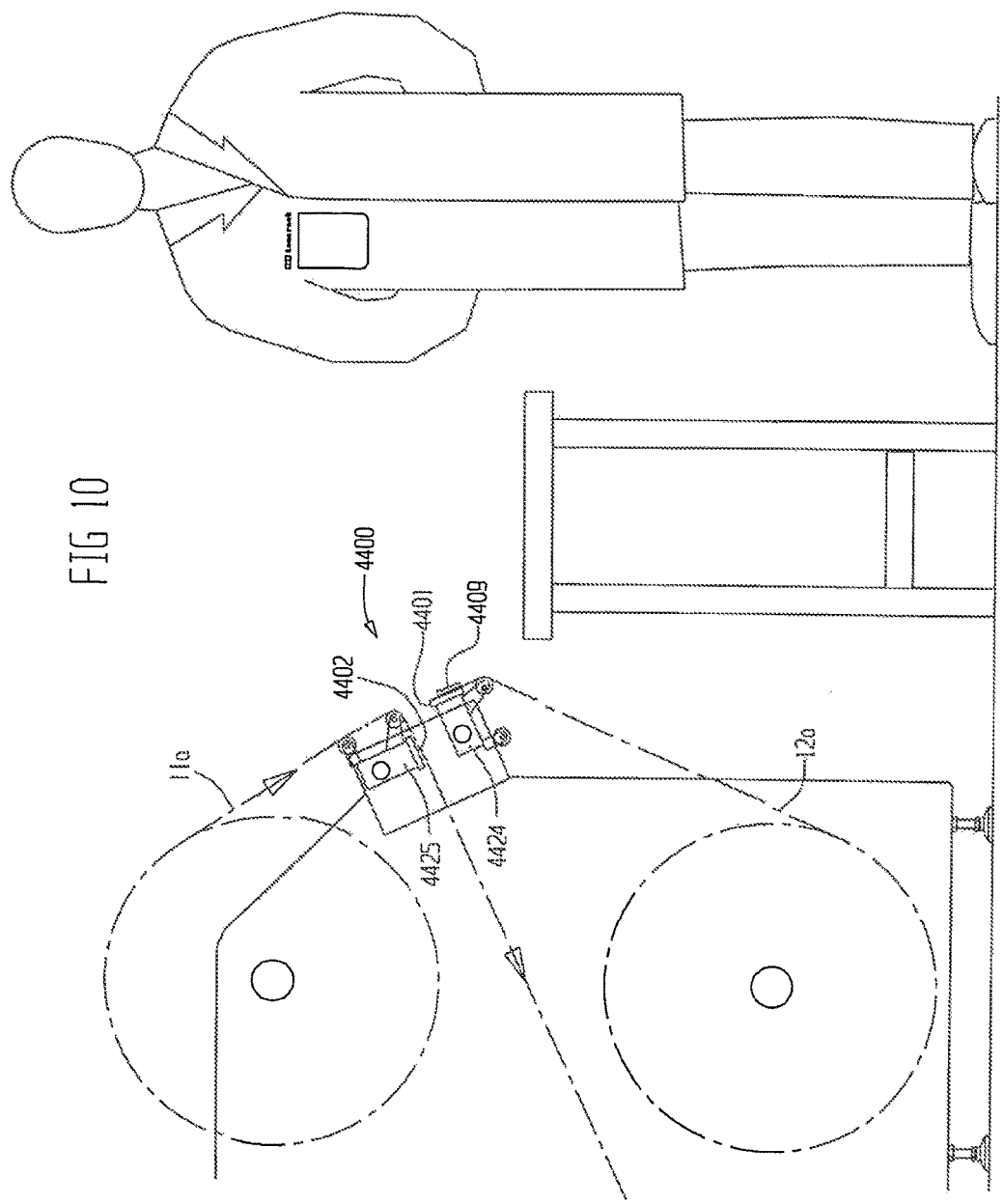

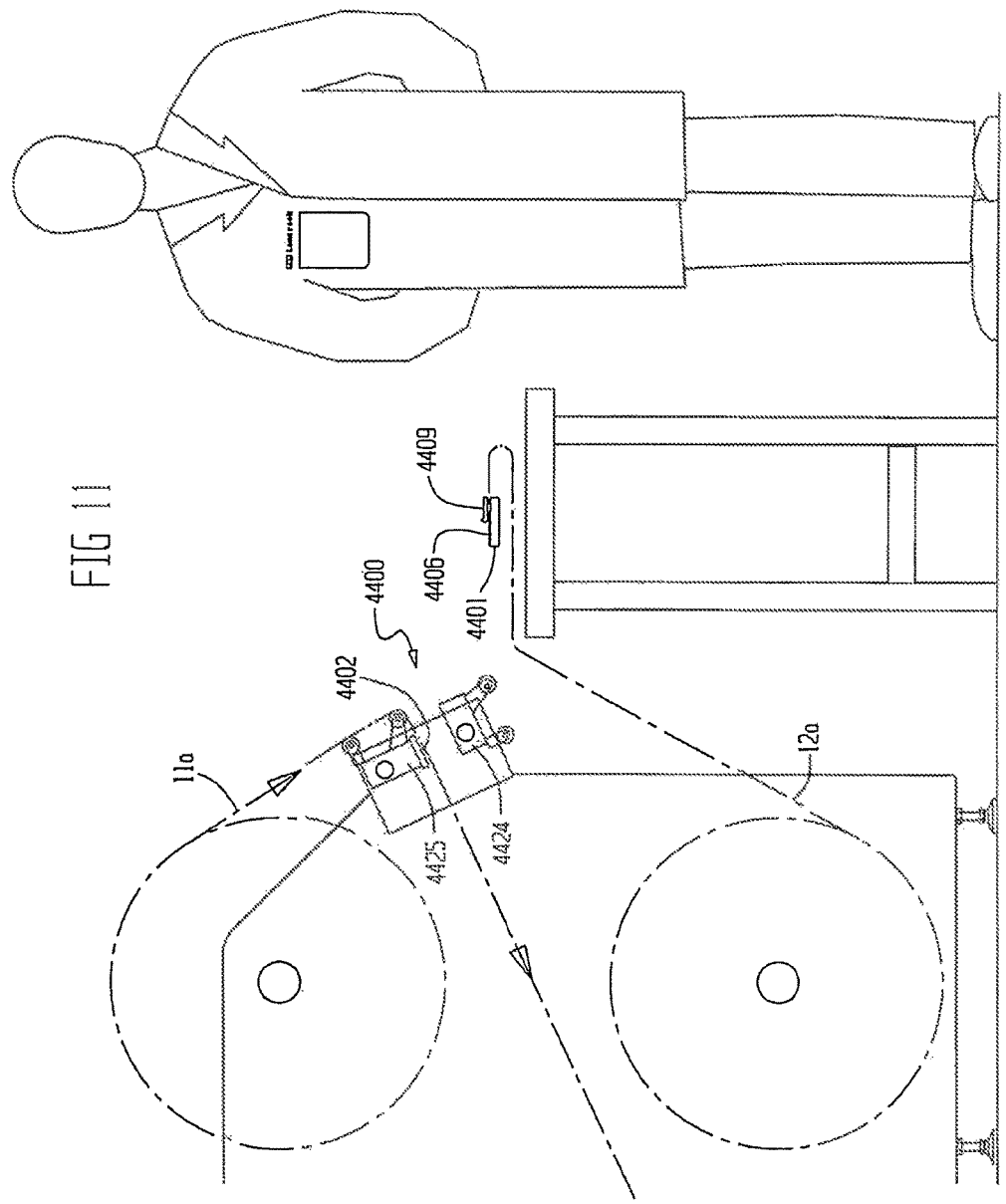

PLATEN WEB SPLICER APPARATUS AND METHOD

RELATED APPLICATION

The present application claims 35 USC 119(e) priority from U.S. Provisional application Ser. No. 62/048,064 filed Sep. 9, 2014.

FIELD OF THE INVENTION

The present invention provides an improved splicing apparatus and method suitable for handling a wide range of materials, web widths, and web thicknesses, and is particularly adapted for handling relatively delicate webs of paper or poly film material.

BACKGROUND OF THE INVENTION

Splicers are machines that provide a supply of web material to a web consuming process without interruption to reload the web material. In general, a roll of web material is consumed, and as it approaches depletion, is spliced to a new, replenishing roll without interrupting the supply of web material to the web consuming process. The instant invention is an improvement on the splicer invention covered in U.S. Pat. No. 8,002,924 B2 the disclosure of which is hereby incorporated by reference in this application. The present invention uses a similar roll unwind and accumulator arrangement as in the earlier splicer disclosed in U.S. Pat. No. 8,002,924. However, the portion of the apparatus and method used to splice a replenishing web to a depleting web is different from, and represents an improvement over, the corresponding arrangement in U.S. Pat. No. 8,002,924.

SUMMARY OF THE INVENTION

The present invention uses two reciprocating platens to perform the following functions:
  form a passageway between the platens for the depleting web to travel through;
  engage and support the taped end of a replenishing web;
  engage and support a cutting blade;
  grip the depleting web and momentarily bring it to a stop;
  press the taped end of the replenishing web into contact with the depleting web;
  cut the depleting web;
  engage and support the cut ends of the depleting web;
  release the upstream cut end of the depleting web with the replenishing web taped to it, allowing continuing supply of the replenishing web to the web consuming machine, such as the Tamarack Vista window applicator; and
  engage and support the other cut end of the depleting web so that the depleted roll can be removed from the splicer machine and replaced with a new replenishing roll.

Advantages of the present invention over the prior art include:
  no vacuum blower needed to hold the prepared end of the replenishing web which saves initial cost and reduces energy consumption;
  no slack loop needed in the replenishing web;
  splice can be prepared remotely which allows splicer to be mounted directly in-line with web-consuming equipment which typically has limited access to splicer mechanism, and also provides increased safety as splice can be prepared away from moving machinery;
  splice can be made to a moving or stationary expiring web, as in the case of a stationary splice, there is no pull on the expiring web;
  prepared end of replenishing web is securely held in place by magnetic clamping;
  capable of extremely short cycle duration which provides minimal interruption of web movement during a splice;
  pressure, severing cut is more adapted for use with stretchy, grabby materials than splicers that have a cutting blade which laterally traverses the web;
  cutting blade uses flex die technology, rather than shear cutting knives which can be costly and bulky, such as cutting rule or razor blades; blades can be easily changed and are less likely to accidently cut operator because they need not be as sharp as other types of blades; and blade changes take minimal time because the blade is installed during preparation of each splice;
  cutting pressure is easily adjusted using stop screws;
  splicing mechanism is inherently safer than prior art not only due to the flex die cutting knife, but also because of relatively short travel motion during actuation, and blade is essentially inaccessible after splice is prepared;
  mechanism is simpler, compact and highly accessible;
  function is easy to see and understand;
  cutting sequence is simple and does not require complex steps, sequencing, or controls, such as a programmable logic controller (PLC); and
  splice can be powered with a simple reciprocating actuator such as an air cylinder, as opposed to more costly electric motors.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 1 and 1A are respectively simplified schematic illustrations of a web supply arrangement and a carriage and control system of the Applicant's prior U.S. Pat. No. 8,002,924;

FIGS. 2 and 2A are respectively simplified schematic illustrations of a web supply arrangement and a carriage and control system of the present invention;

FIG. 4 is a simplified schematic cross section view of the splicing platens of the present invention;

FIG. 5 is a simplified schematic cross section view similar to FIG. 4, but showing the platens closing;

FIG. 6 is a simplified schematic cross section view similar to FIGS. 4 and 5, but representing a further point in the cycle where the expiring web is gripped so as to be in contact with the prepared end of a replenishing web just before the expiring web is severed;

FIG. 7 is a simplified schematic cross section view similar to FIGS. 4, 5, and 6, but representing a still further point in the cycle where the platens are opening, the outfeed end of the expiring web is fastened to the replenishing web, the expiring web is cut and the cutting die is transferred to the opposite platen via magnetic force, and thereby holds the cutting die and the remaining, severed end of the expiring web to form a butt splice;

FIG. 8 is a simplified schematic cross-section view of the first and second platens set up for a lap splice rather than the butt splice illustrated in FIGS. 4-7;

FIG. 9 is a simplified schematic cross-section view similar to FIG. 8, where the completed lap splice between the replenishing and expiring webs is illustrated;

FIG. 10 is a simplified schematic view of the web unwind and splicing apparatus of the present invention; and FIG. 11 is a simplified schematic front elevation view of the inventive unwind and splicing apparatus showing one of the patens removed from the apparatus to facilitate attachment of a web to the platen.

DETAILED DESCRIPTION OF THE PREFERRED EMBODIMENTS OF THE INVENTION

Figure 1:
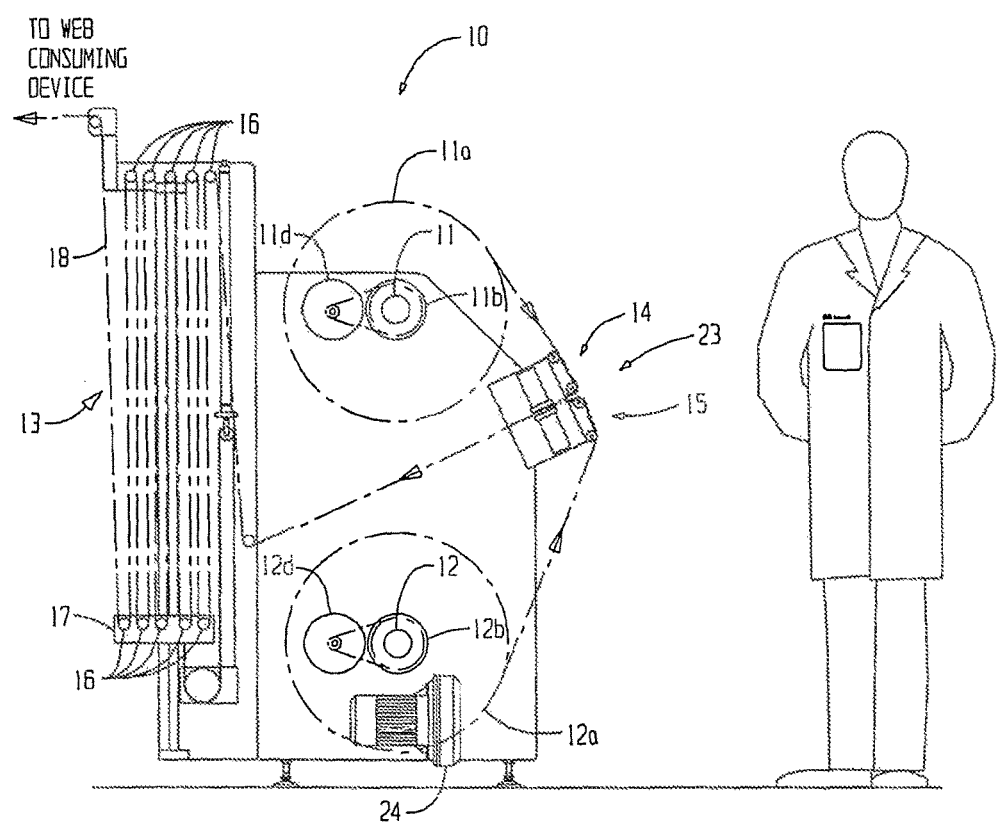

The present invention has an arrangement generally similar to that illustrated in FIGS. 1 and 1A of U.S. Pat. No. 8,002,024. The identifying element numbers used in the aforementioned patent are also used in the following description for corresponding elements in the present invention where the corresponding elements perform the same, or substantially the same function, and do not form part of the present invention. The roll unwind spindles 11 and 12 are controlled in a similar manner and the accumulator 13 has a similar format. However, in the instant invention, the accumulator 13 is mounted above the unwind spindles 11 and 12 which reduces the height of the spindles for easier loading. The spindle location may be provided in a variety of alternative formats according to a user's preference and procedures for loading rolls 11a, 12a and accessing the splicing apparatus. The function and interaction of the unwind spindles 11, 12, their drives 11d, 12d and brakes 11b and 12b, and accumulator 13 are similar to the description provided at col 3, line 14-col. 5, line 35, in U.S. Pat. No. 8,002,924.

Figure 3:
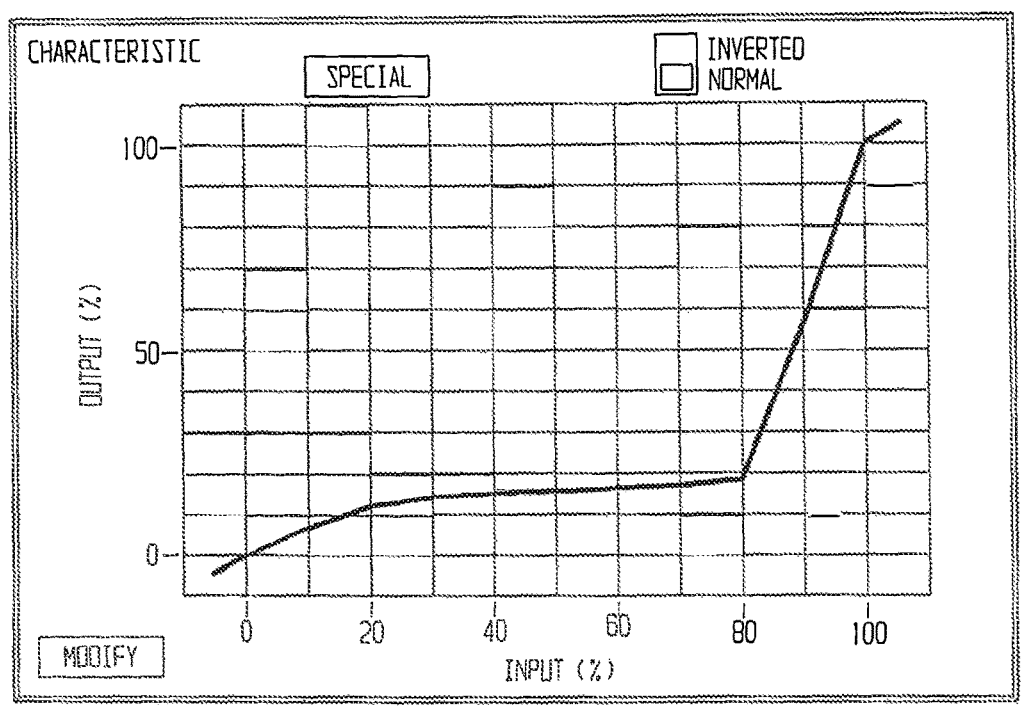
FIG. 3 is a software screen view illustrating, among other things, a programmed output vs. input curve for controlling the spindle braking in the present invention.

The control of the drives 11d, 12d in the present invention is somewhat revised from FIG. 1A and the text at col. 4 lines 30-41, in U.S. Pat. No. 8,002,924. In the instant invention, carriage 17 moves downwards when film is consumed rather than upwards as shown in the disclosure of U.S. Pat. No. 8,002,924, and a visible laser displacement sensor such as a Banner Engineering® (Minneapolis, Minn.) L-Gage® LE550 is used to sense the position of the carriage 17. The L-Gage provides an analog current output, of approximately 4-20 ma. The current output is used as an input to a Camille Bauer™ (Wohlen, Switzerland) Sineax™ TV809 Programmable Isolating Amplifier which provides a programmable output vs. input curve as shown in FIG. 3. The Sineax™ output current is used as in input to the disclosed Proportion-Air® air pressure regulator to control air pressure provided to brakes 11b and 12b as disclosed in U.S. Pat. No. 8,002,924.

Figure 2:
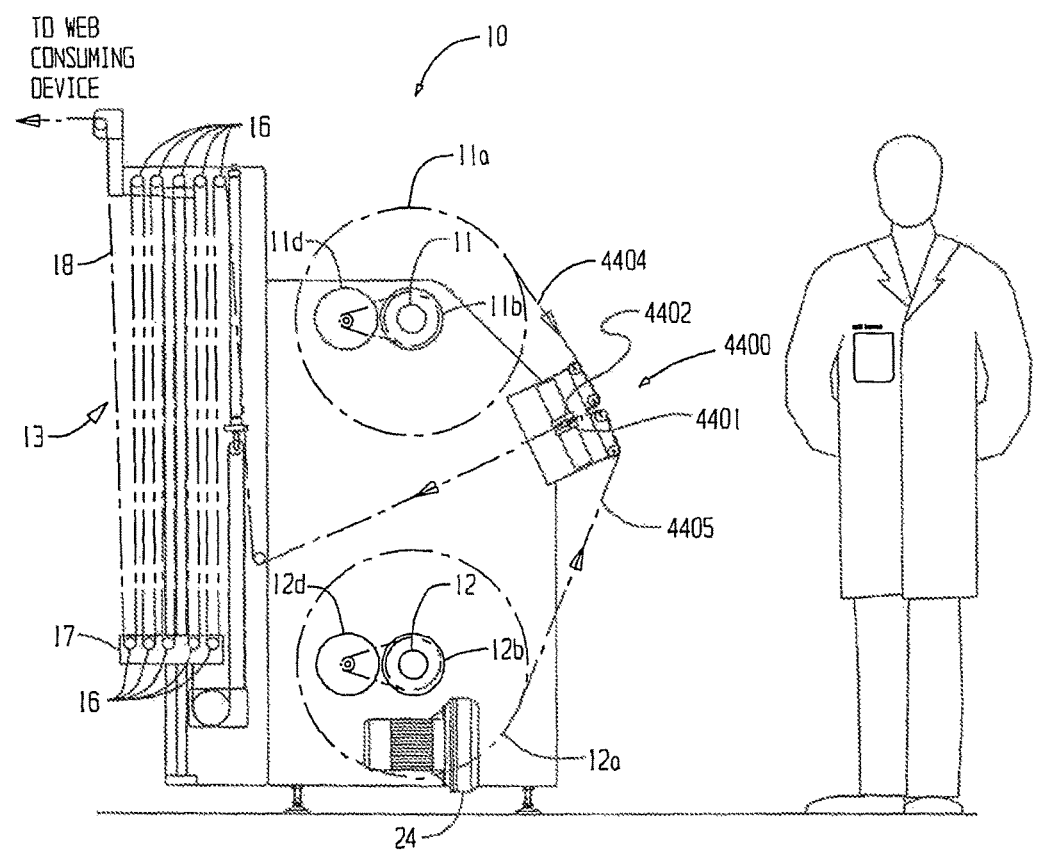

While the inventive splicing apparatus 4400 of the instant invention shown in FIGS. 2, 2A and 4 is located in a similar orientation to that shown in FIG. 1 of U.S. Pat. No. 8,002,924, the splicing apparatus of the present invention is substantially different from the splicing apparatus shown in FIGS. 3-6 of U.S. Pat. No. 8,002,924. Instead of using a pair of splicing cylinders 314, 315 as in U.S. Pat. No. 8,002,924, the present invention uses a pair of platens 4401, 4402, as schematically illustrated in FIG. 4. The platens 4401, 4402, extend longitudinally (90 degrees to the plane of the cross sectional view of FIG. 4) to define the effective width of the splicer apparatus 4400 and reciprocate in the direction indicated by the arrows 4414 and 4415. The reciprocating motion is provided by a crankshaft and a connecting rod in each of slider drive mechanisms 4426 and 4427, with one of the drive mechanisms driving one of the platens 4401 and 4402. The crankshafts are linked together with a timing belt and pulleys and may be rotated via a hand crank or may be motor-driven. Alternatively, the platens may be cycled or reciprocated via a pneumatic cylinder (not shown) such as provided by Clippard Instrument Laboratory of Cincinnati, Ohio. The space between the platens defines a passageway 4403 through which an expiring web 4404 may pass. As in U.S. Pat. No. 8,002,924, web 4404 may be comprised of various materials such as paper, poly film, magnetic material, or thin metal foils. The reciprocating motion allows the passageway 4403 to be nearly closed and re-opened by moving platens 4401 and 4402 from the positions shown in FIG. 4.

The platens, cranks, connecting rod and sliders may be swung through about 180 degrees outwards with detents approximately every 90 degrees to allow easier access for an operator to set up for a splice.

Splice Preparation:

A piece of adhesive tape 4406 is shown in FIG. 4 disposed on the inner surface of platen 4401. An adhesive side 4407 of the tape 4406 is facing outwards (or to the left) from platen 4401 and approximately one-half of the tape is adhered to a replenishing web 4405. The other half of the tape has its adhesive side 4407 exposed and will be used to join the replenishing web 4405 to web 4404 which is also known as the depleting, or expiring, web or roll web because the source roll 11a from which web 4404 is unwinding and is nearing at its end and it is desirable to attach a new supply of web 4405 from a new source roll 12a as shown in FIG. 2, and then sever the remaining expiring web 4404 so that the web-consuming process may continue without stopping the process. The end of replenishing web 4405 is held in place on platen 4401 by a steel die strip 4409. The die strip 4409 is in turn held in place by a series of magnets 4411. The size of the magnets may be selected to adjust the magnetic attracting force. Holes 4409a may be formed on die strip 4409 with locations corresponding to the location of magnets 4411 as another means of adjusting the magnetic attraction force. Typically, the magnets are cylindrical and the polarity of the magnets is selected during assembly of the apparatus such that the North pole (for example) of the magnets is facing outward away from die strip 4409 as shown in FIG. 4.

Triggering a Splice:

A splice may be triggered by known methods: manually by an operator observing that a supply roll is near depletion and then the operator makes the splice by rotating a hand crank through about one turn; semi-automatically by a roll size sensor that signals a visual and or audible alarm when a supply roll is nearly deleted and then an operator makes the splice by rotating a hand crank; or fully automatically where a roll size sensor and control system detects that a supply roll is nearly depleted and triggers a motor drive to rotate the crankshafts.

Making a Splice:

Rotating the crankshafts initiates a splicing cycle by, first, moving the platens 4401 and 4402 inwards toward one another to a stop which causes depleting web 4404 to be momentarily grasped against platen 4401 by an ironing pad 4408 on platen 4402 which presses the depleting web 4404 against the sticky side 4407 of exposed tape 4406 which has been previously adhered (during preparation) to the end of replenishing web 4405. Nearly simultaneously, a die strip 4409 with a cutting edge 4410 presses on and cuts through the depleting web 4404. The loose end of depleting web 4404 is held in place by the die strip 4409 as will be described.

FIG. 5 shows the step in the splicing sequence where expiring web 4404 is just contacting ironing pad 4408, but not yet clamped against the adhesive side 4407 of tape 4406.

FIG. 6 shows a further step in the cycle where the expiring web 4404 is clamped into contact with the adhesive side 4407 of tape 4406, and cutting edge 4410 of die strip 4409 is just about to begin cutting expiring web 4404.

As the splicing cycle proceeds (see FIG. 7), the platens 4401 and 4402 begin to separate, or open. The die strip 4409 separates from platen 4401 because platen 4402 has more powerful magnets 4412 which are offset longitudinally with respect to the plane of the cross section of FIG. 7 so that their central axis is not aligned with the magnets 4411 in the opposing platen 4401. This causes the die strip 4409 to separate from platen 4401 and transfer to platen 4402 and thereby desirably trapping the severed end of depleting web 4404 against platen 4402, while allowing the spliced replenishing web 4405 to proceed through the splicer 4400 and provide web to the web consuming device (not shown), such as a Tamarack® Vista® window applicator.

The magnets 4411 and 4412 can operate in conjunction with a respective movable member 4418, 4419 such as a Delrin® bar with or without a steel backing. The movable members 4418, 4419 can move outwards from the platens 4401, 4402 to improve the transfer of die strip 4409 from one platen to the other.

In another embodiment, a mechanical gripper (not shown) can be used in conjunction with magnets, or without magnets, to hold or transfer the die strip 4409 to or from the first and second platens 4401, 4402.

The splicing arrangement shown in FIGS. 4-7 is for producing a butt splice where the adjacent ends of the depleting web 4404 and the replenishing web 4405 are aligned with one another in a non-overlapping manner. In this type of splice, the adhesive tape 4406 is attached to aligned surfaces of the depleting web 4404 and the replenishing web 4405. FIGS. 8 and 9 are directed to the formation of a lap splice where the adjacent ends of the depleting web 4404 and the replenishing web 4405 are arranged in an overlapping manner with the adhesive tape 4420 engaging and coupling together the overlapping end portions of the depleting and replenishing webs. When the depleting web 4404 is severed by die strip 4409, an outfeeding end 4404A and an infeeding end 4404B of the depleting web are formed. The depleting web's outfeeding end 4404A is attached to the end of the replenishing web 4405 as shown in FIG. 9. The depleting web's severed infeeding end 4404B is engaged and collected by die strip 4409.

The depleting web 4404 is stopped very momentarily during the splice process, however, at typical operation speeds, e.g., up to about 600 fpm or 10 inches/second, this momentary stoppage only causes a shortage of an inch or two of web to the web consuming process downstream of the splicer. This relatively minor amount of web interruption is readily accommodated by the accumulator 13 which is normally equipped to deliver web to a web consuming machine such as the Tamarack Vista window applicator which operates in a stop-and-go manner, as disclosed in U.S. Pat. No. 6,772,663 and U.S. patent application Ser. No. 12/751,014, where the web pauses until another carton blank arrives to be windowed and then, for example 18" of web is demanded, cycling at approximately 10,000 cartons per hour or 2.8 cycles per second. This stop-and-go consumption of web is 9 to 18 times more web than the splicer's interruption.

The replenishing roll 12a needs to accelerate from zero to an average web speed to match the average speed of the web consuming process. Unwind drive 12d is sized and adjusted to provide this acceleration, while accumulator 13 cycles to provide the web demanded by the web consuming process. These aspects of buffering the supply of web with an accumulator are known in the art.

Preparing and Making the Next Splice:

The pair of platens 4401, 4402 can be utilized such that the prepared tape 4406 and replenishing web 4405 can first be installed on platen 4401 as described above, and then for a subsequent splice, the die plate 4409 is installed on platen 4402. Similarly, with reference to FIG. 2, the first depleting roll 11a could be installed on spindle 11 and the replenishing web 12a on spindle 12. While roll 12a is being consumed, the next replenishing roll would be installed on spindle 11. In this manner (which is further described in U.S. Pat. No. 8,002,924), the splicer 10 can supply web to a web-consuming process without interruption.

Other Enhancements:

Platens 4401 and 4402 are removable and interchangeable so that splices may be prepared remotely from the splicer assembly 4400 as shown in FIGS. 10 and 11, where the first splicer mechanism 4424 has been swung open (see FIG. 10) and platen 4401 has been removed from splicer apparatus 4400 (see FIG. 11) to facilitate attachment of replenishing roll 12a to the combination of the first platen, die strip 4409 and adhesive tape 4406. The prepared platen 4401 (with replenishing web 4405, adhesive tape 4406 and die member 4409) is then easily installed onto first splicer mechanism 4424 of splicing apparatus 4400 (see FIG. 10) and swung to its ready-to-splice position (see FIG. 2) to continue the splicing operation. Platens 4401 and 4402 may be provided in different widths and offset formats for easier preparation of splices. For example, if the web is only a few inches wide, a narrower platen may be used which will be lighter and easier for an operator to manipulate.

The first and second platens 4401, 4402 may be held in place in first and second reciprocating splicer mechanisms 4424 and 4425, respectively, in splicer apparatus 4400 with magnets or other retaining means such as mechanical couplers, i.e., spring clip, clamps, wires or Velcro, to provide for tool-less installation and removal.

A compound-hinged flap with a ruler scale on one side and a non-stick surface such as provided by Tesa® (Hamburg, Germany) Printer's Friend® 4863 tape on the other side can be used during splice preparation to laterally position the end of replenishing web 4405 by using the ruler side and then by swinging the door though about 180 degrees so that the adhesive tape 4406 is held against platen 4401. Once the die strip 4409 is placed into position on the end of replenishing web 4405, the door is swung about 180 degrees to the opposite side of the platen so that it does not interfere with the splicing process.

While particular embodiments of the present invention have been described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper prospective based on the prior art.

What is claimed is:

1. A splicing apparatus for replacing an expiring web from an expiring roll of web material with a replenishing web from a replenishing roll of web material, said apparatus comprising:
   first and second platens disposed in a spaced manner from one another so as to define a passageway between the first and second platens for allowing the expiring web to transit the passageway, wherein said expiring web is directed between said platens through said passageway, and wherein said platens are adapted for displacement toward and away from one another in a reciprocating manner;
   an adhesive member attached to the replenishing web in facing relation to said second platen, wherein said adhesive member is adapted to engage and attach said replenishing web to said expiring web;
   a die member having a cutting portion and a clamping portion;
   retaining means attached to said first platen for initially attaching said die member to said first platen in a releasable manner while clamping said replenishing web to said first platen with the clamping portion of said die member; and
   a pad member disposed on said second platen in facing relation to said first platen and adapted to engage and urge toward said first platen the expiring web transiting the passageway between the platens when said platens are displaced toward one another so that a first surface of said expiring web is placed in intimate contact with said pad member and a second opposed surface of said expiring web is placed in contact with said adhesive member and said die member's cutting edge so as to sever said expiring web and attach said expiring web's outfeeding end to the replenishing web via said adhesive member in splicing the expiring and replenishing webs together, and wherein said retaining means releases said die member from said first platen thereby freeing said replenishing web from said first platen and attaches said die member to said second platen for engaging and clamping a severed infeeding end of said expiring web to said second platen in effecting transfer of said die member from said first platen to said second platen.

2. The apparatus of claim 1, wherein said retaining means is magnetic.

3. The apparatus of claim 2, wherein said magnetic retaining means includes at least one magnet disposed in each of said first and second platens, and said die member is comprised of a magnetic responsive material.

4. The apparatus of claim 3, wherein said die member is comprised of steel.

5. The apparatus of claim 3, wherein each of said magnets includes north and south poles, with the north pole of each magnet facing outwardly away from said die member.

6. The apparatus of claim 3, wherein a magnetic attraction of said at least one magnet in said second platen exerted on said die member is greater than a magnetic attraction of said at least one magnet in said first platen exerted on said die member to allow said die member to be released from said first platen followed by attachment of said die member to said second platen during replacement of the expiring web with the replenishing web.

7. The apparatus of claim 6 further comprising means within said die member for changing the respective magnetic attractions of the magnets in said first and second platens exerted on said die member to transfer said die member from said first platen to said second platen.

8. The apparatus of claim 7, wherein said means for changing the magnetic attractions of said first and second platens exerted on said die member includes one or more spaced apertures within said die member.

9. The apparatus of claim 8, wherein said die member is disposed between said first platen and said second platen and the respective magnetic attractions of the magnets in said first and second platens exerted on said die member includes changing the circumference of an aperture disposed in said die member or changing the number of plural apertures in said die member.

10. The apparatus of claim 1, wherein the transfer of said die member from said first platen to said second platen occurs when said expiring and replenishing webs are spliced together.

11. The apparatus of claim 1, wherein said retaining means includes mechanical couplers for attaching said first and second platens to said die member.

12. The apparatus of claim 11, wherein each of said mechanical couplers attaches said first and second platens to said die member in a releasable manner.

13. The apparatus of claim 12, wherein said mechanical couplers include spring clips, clamps, wire or Velcro.

14. The apparatus of claim 1, further comprising first and second drive means respectively coupled to said first and second platens for linearly displacing said platens toward and away from one another in a reciprocating manner during splicing of the replenishing and expiring webs.

15. The apparatus of claim 14, wherein each of said first and second drive means includes a respective combination of a crankshaft, a connecting rod and a slider mechanism.

16. The apparatus of claim 15 further comprising a timing belt and pulley combination coupling said crankshafts together to synchronize movement of said first and second platens.

17. The apparatus of claim 16 further comprising a hand crank or a motor coupled to said timing belt and pulley combination for manually or automatically rotationally displacing said crankshafts.

18. The apparatus of claim 14, wherein said first and second drive means include respective first and second pneumatic cylinders for linearly displacing said platens toward and away from one another in a reciprocating manner.

19. The apparatus of claim 1, wherein said passageway defined by said first and second platens alternately widens and narrows during splicing of the replenishing and expiring webs.

20. The apparatus of claim 19, wherein said first and second platens are in spaced relation to one another during splicing of the replenishing and expiring webs.

21. The apparatus of claim 1, wherein the replenishing and expiring webs are comprised of paper, poly film, magnetic or thin metal foil materials.

22. The apparatus of claim 1, wherein said adhesive member initially extends beyond the end of the replenishing web in forming a non-overlapping butt splice between the replenishing and expiring rolls of web material.

23. The apparatus of claim 1, wherein said adhesive member initially extends only over a portion of said first platen so as to form an overlapping splice between the replenishing and expiring webs.

24. A method for splicing an expiring web from an expiring roll of web material to a replenishing web from a replenishing roll of web material, said method comprising the steps of:
- displacing the expiring web along its length between first and second platens;
- positioning an end of the replenishing web on an inner surface of the first platen in facing relation to said second platen;
- attaching a die member having a cutting portion and a clamping portion to said first platen so that the end of the replenishing web is disposed between, and engaged by, said die member and said first platen;
- providing a pad member on an inner surface of said second platen in facing relation to said first platen;
- displacing said first and second platens toward one another with the expiring web disposed in facing relation to and between the respective inner surfaces of said first and second platens;
- affixing the end of the replenishing web to the moving expiring web;
- severing the expiring web with the die member's cutting portion in forming an outfeeding end and an infeeding end of said expiring web;
- adhesively attaching said expiring web's outfeeding end to the replenishing web in splicing the expiring and replenishing webs together;
- transferring the die member from the first platen to the second platen in freeing the replenishing web from the first platen and engaging and holding the severed infeeding end of the expiring web to the second platen; and
- displacing said first and second platens away from one another allowing the expiring web and the replenishing web attached to the outfeeding end of the expiring web to exit from between the first and second platens.

25. The method of claim 24 further comprising the step of providing a die member comprised of metal and transferring said metal die member from said first platen to said second platen using a magnetic field.

26. The method of claim 25 further comprising the step of increasing the strength of said magnetic field from said first platen to said second platen for transferring said die member from said first platen to said second platen.

27. The method of claim 24 further comprising the step of initiating a second splicing of a replenishing web to a second expiring web by attaching a second replenishing web to said second platen.

28. The method of claim 24, wherein said replenishing and expiring webs are initially disposed in an aligned, spaced manner along their respective lengths so as to form a butt splice.

29. The method of claim 24, wherein said replenishing and expiring webs are initially disposed in an overlapping manner so as to form a lap splice.

30. The method of claim 24 further comprising the step of providing a magnetic responsive die member and increasing the strength of the magnetic field in proceeding from said first platen to said second platen for transferring said magnetic responsive die member from said first platen to said second platen during splicing together of the expiring and replenishing webs.

31. The method of claim 24, wherein said first and second platens are installed in a splicing apparatus, said method further comprising the step of removing said first platen from said splicing apparatus to facilitate attaching a replenishing web to said first platen, and replacing said first platen in the splicing apparatus.

32. The method of claim 24 further comprising the step of providing an ironing pad on said second platen in facing relation to said first platen to engage and support, as well as facilitate cutting of, said expiring web.

33. The method of claim 24, wherein said die member engages and maintains the severed infeeding end of said expiring web in secure contact with said second platen for separating and holding said severed infeeding end from the spliced expiring and replenishing webs.

34. The method of claim 24 further comprising the step of providing first and second magnets respectively in said first and second platens for applying a changing magnetic field to said die member for transferring said die member from said first to said second platen.

35. The method of claim 34 further comprising the step of moving the first and second magnets outward from said first and second platens toward an opposing platen.

36. The method of claim 24 further comprising the step of providing a new replenishing web to said second platen and providing said die member to said second platen when replacing an original replenishing web.

37. The method of claim 24 further comprising the step of mechanically attaching said replenishing web to said first platen and said expiring web to said second platen.

* * * * *